United States Patent [19]

Deguchi

[11] Patent Number: 5,822,101
[45] Date of Patent: Oct. 13, 1998

[54] STRUCTURE OF A LIGHT INPUT/OUTPUT SECTION OF A PORTABLE INFRARED DATA COMMUNICATION TERMINAL

[75] Inventor: Manabu Deguchi, Tokyo, Japan

[73] Assignee: NEC Corporation, Tokyo, Japan

[21] Appl. No.: 715,550

[22] Filed: Sep. 19, 1996

[30] Foreign Application Priority Data

Sep. 21, 1995 [JP] Japan .................................. 7-243462

[51] Int. Cl.⁶ .................................................. H04B 10/00
[52] U.S. Cl. ........................... 359/172; 359/159; 359/147
[58] Field of Search ................... 359/152, 159, 359/172, 143, 144, 147, 163; 174/50.51, 50.52

[56] References Cited

U.S. PATENT DOCUMENTS

| | | | |
|---|---|---|---|
| 4,867,560 | 9/1989 | Kunitsugu | 359/159 |
| 5,065,455 | 11/1991 | Ito et al. | 359/159 |
| 5,073,979 | 12/1991 | Webb . | |
| 5,329,359 | 7/1994 | Endo et al. | 359/159 |
| 5,390,040 | 2/1995 | Mayeux | 359/152 |
| 5,530,578 | 6/1996 | Takemoto et al. . | |
| 5,627,669 | 5/1997 | Orino et al. | 359/156 |

FOREIGN PATENT DOCUMENTS 56-147635  11/1981  Japan .
2125647   3/1994  United Kingdom .

OTHER PUBLICATIONS

Japanese Abstract Accession No. 04344343, JP 05 336 043, Dec. 17, 1993.

*Primary Examiner*—Rafael Bacares
*Attorney, Agent, or Firm*—Ostrolenk, Faber, Gerb & Soffen, LLP

[57] ABSTRACT

In a portable data terminal for infrared data communication, a light input/output section has a structure capable of varying the direction in which the data terminal emits and receives infrared rays.

35 Claims, 5 Drawing Sheets

5,822,101

STRUCTURE OF A LIGHT INPUT/OUTPUT SECTION OF A PORTABLE INFRARED DATA COMMUNICATION TERMINAL

BACKGROUND OF THE INVENTION

The present invention relates to a portable data terminal using infrared rays as a data communication medium and, more particularly, to the structure of a light input/output section of such a portable data terminal.

Today, portable or wireless data terminals using infrared rays or similar light as a communication medium are available and used to interchange data with each other within a relatively limited space. This kind of data terminal has a light input/output section including a generally flat light transmitting window member, a light-sensitive device, and a light emitting device. The window member is mounted on one side of the casing of the terminal. The light-sensitive device and light emitting device are disposed in the casing and respectively receive and emit data in the form of infrared rays via the window member. Because the light input/output section receives and emits infrared rays in a single fixed direction, the terminal is positioned during communication such that its light input/output section faces the light input/output section of a desired data terminal. Because such a configuration limits the positional relation between the two terminals, the user of each terminal must reposition it, e.g., sideways or upside down each time. To solve this problem, Japanese Utility Model Laid-Open Publication No. 56-147635, for example, discloses a light emitting device consisting of a plurality of light emitting devices each having a particular directivity characteristic. However, this kind of scheme needs a sophisticated structure and reduces the life of a battery powering the data terminal.

SUMMARY OF THE INVENTION

It is therefore an object of the present invention to provide a structure of a light input/output section of a portable data terminal capable of varying the direction in which infrared rays carrying data are input and output therefrom.

It is another object of the present invention to provide a structure of a light input/output section of a portable data terminal for infrared data communication which is simple and does not reduce the life of a battery.

A structure of a light input/output section of a portable data terminal for infrared data communication of the present invention has a light emitting device for emitting infrared rays, a light-sensitive device for receiving infrared rays, a casing accommodating the light emitting device and light-sensitive device, a window extending over two adjoining sides of the casing, an operating device for selectively causing the light emitting device and light-sensitive device to respectively emit and receive the infrared rays in one of a first and a second direction, and a mirror rotatable in interlocked relation to the operating device for reflecting in the second direction the infrared rays incident thereto in the first direction.

BRIEF DESCRIPTION OF THE DRAWINGS

The above and other objects, features and advantages of the present invention will become apparent from the following detailed description taken with the accompanying drawings in which.

DESCRIPTION OF THE PREFERRED EMBODIMENTS

Figure 8:
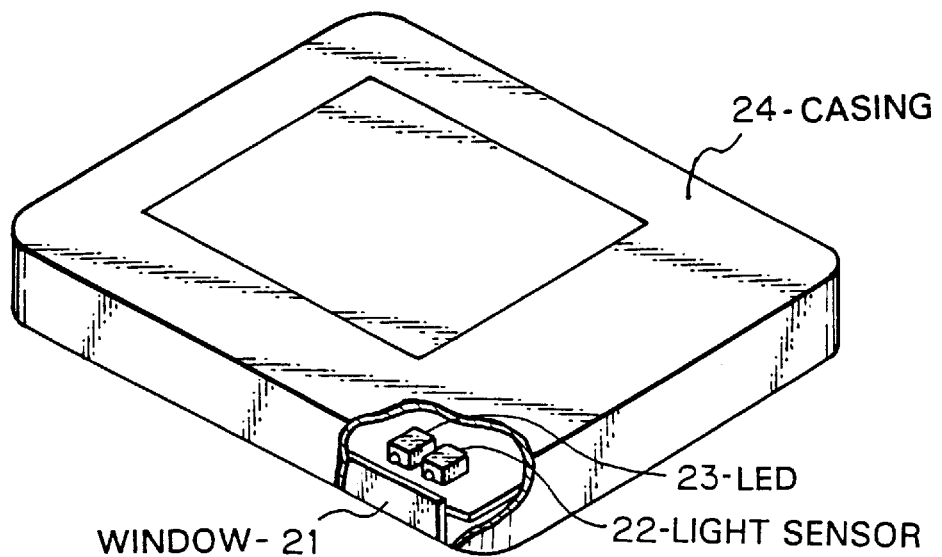
FIG. 8 is a perspective view showing a conventional light input/output section included in a portable infrared data communication terminal.

To better understand the present invention, a brief reference will be made to a conventional light input/output section included in a portable data terminal for infrared data communication. As shown in FIG. 8, the apparatus has a casing 24, a light transmitting window member 21 mounted on one side of the casing 24, a light-sensitive device 22, and a light emitting device 23. The light-sensitive device 22 and light emitting device 23 are disposed in the casing 24. The devices 22 and 23 are soldered or otherwise fixed to the casing 24 in such a manner as to receive and emit light, respectively, in the direction substantially perpendicular to the window member 21. The device 22 receives data in the form of infrared rays sent from another infrared data communication terminal. The device 23 emits infrared rays carrying data meant for a desired infrared data communication terminal.

The light emitting and receiving direction of the conventional data terminal is fixed, as stated above. Therefore, to set up infrared communication with another data terminal having an infrared communication interface, the two terminals are positioned such that their light input/output sections face each other. Because this kind of configuration limits the positional relation between the two terminals, the user of each terminal must reposition it, e.g., sideways or upside down each time, as discussed earlier.

Figure 1:
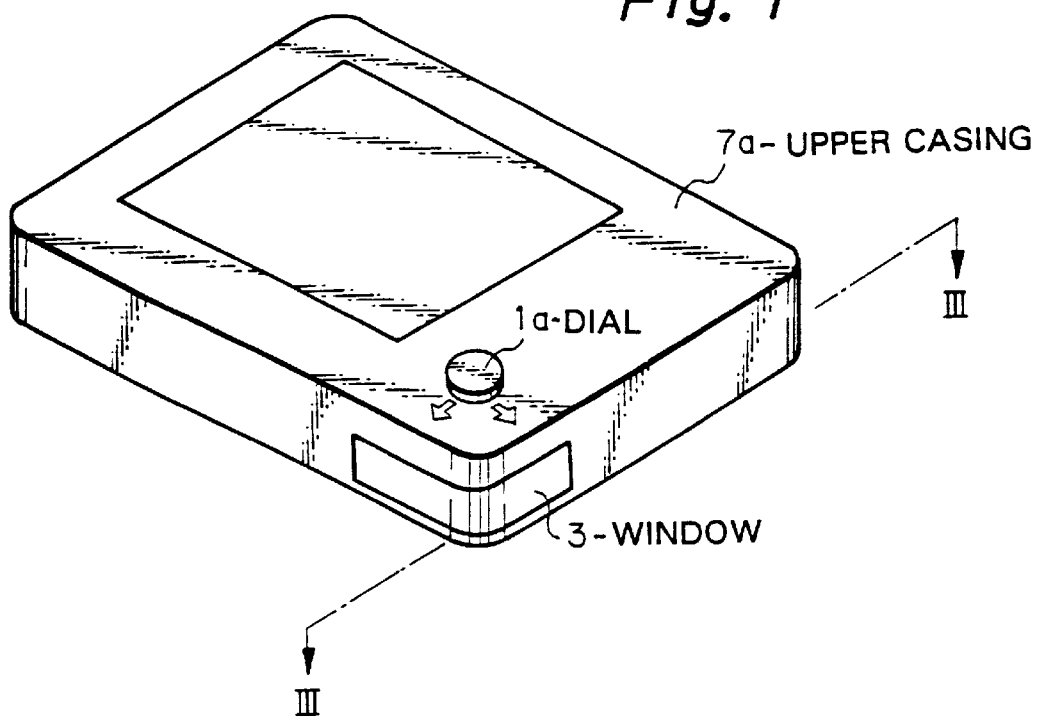
FIG. 1 is a perspective view showing a light input/output section included in a portable infrared data communication terminal and embodying the present invention.
Figure 2:
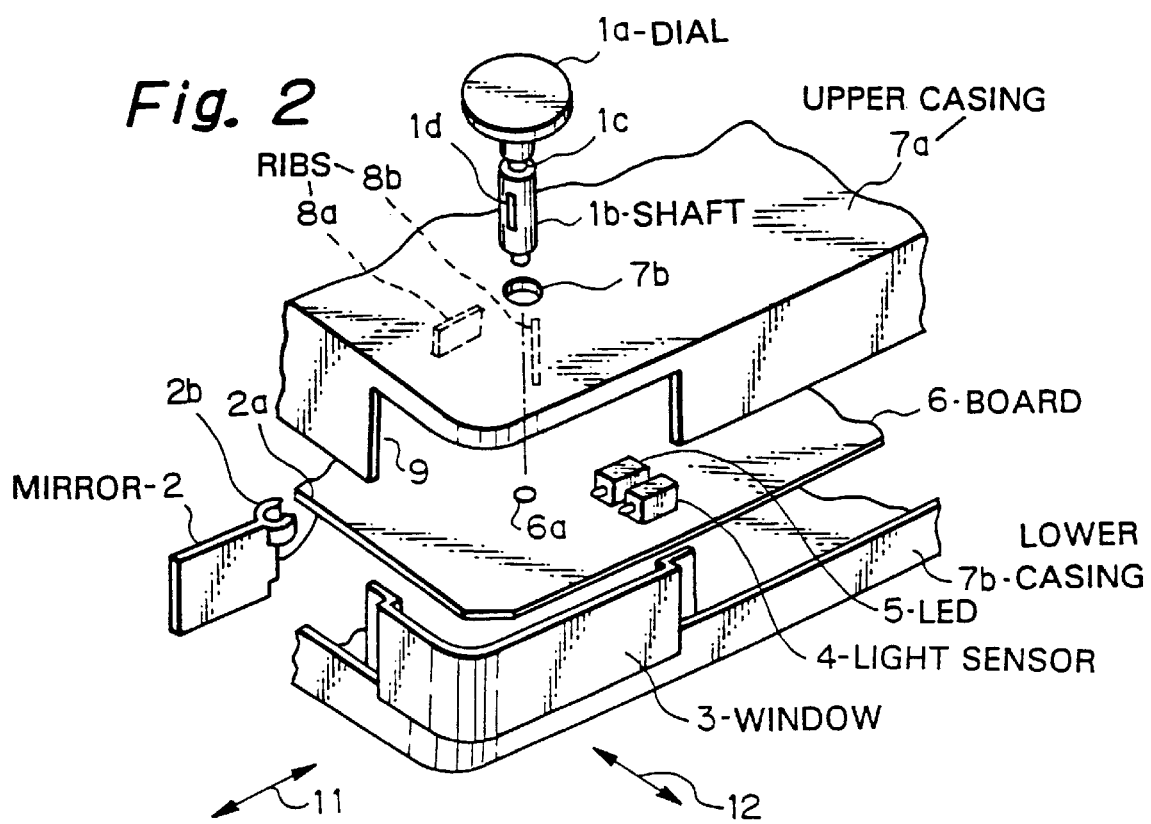
FIG. 2 is an exploded perspective view of the light input/output section shown in FIG. 1.

Referring to FIGS. 1 and 2, a light input/output section embodying the present invention and included in a portable infrared data communication terminal will be described. As shown, the data terminal has an upper casing part 7a and a lower casing part 7b, operating means provided on the upper casing part 7a, a mirror 2 disposed in the casing parts 7a and 7b and rotated by the operating means, and a window 9 formed in one corner of the casing parts 7a and 7b.

The operating means consists of a disk or dial 1a and a shaft 1b extending downward from the dial 1a and positioned in the casing parts 7a and 7b. The dial 1a is positioned on the outer surface of the casing part 7a, so that the user of the data terminal can turn it by hand. The shaft 1b has a neck portion 1c having a reduced diameter, and an axially elongate recess 1d positioned below the neck portion 1c.

A light transmitting window member 3 has a generally L-shaped section and extends over two adjoining sides of the casing part 7a and those of the casing part 7a, i.e., one corner portion of the casing parts 7a and 7b. The window member 3 is received in the casing part 7a over the above two adjoining sides. The mirror 2 has a mating portion 2a formed at one edge thereof and received in the recess 1d of the shaft 1b, so that the mirror 2 is rotatable together with the shaft 1b. Also, the mirror 2 has a holding portion 2b holding the neck portion 1c of the shaft 1b.

When the mating portion 2a of the mirror 2 is inserted in the recess 1d of the shaft 1b, the angle between the mirror 2 and the dial 1a is fixed. The holding portion 2b of the mirror 2 received in the neck portion 1c of the shaft 1b prevents the dial 1a from slipping out of the casing part 7a.

Two ribs 8a and 8b are formed on the inner surface or rear of the casing part 7a, as indicated by phantom lines in FIG. 2. The ribs 8a and 8b are angularly spaced about 45 degrees from each other so as to delimit the rotatable range of the mirror 2.

A light-sensitive device 4 and a light emitting device 5 are disposed in the casing parts 7a and 7b, and each is capable of receiving or emitting infrared rays in two different directions 11 and 12, as needed. Also accommodated in the casings 7a and 7b are a light emitting circuit and a light receiving circuit for respectively driving the devices 5 and 4, and a controller for transforming data to be sent to an infrared signal or a received infrared signal to data.

The shaft 1b is rotatably supported while extending through a hole 7c formed in the upper casing part 7a. The devices 4 and 5 are mounted on a printed circuit board or similar board 6 disposed in the casing parts 7a and 7b. The devices 4 and 5 are each so positioned as to receive or emit light in the direction 11. The lower end of the shaft 1b is received in a hole 6a formed in the board 6.

The light emitting circuit and light receiving circuit for driving the devices 5 and 4 and the controller are implemented as electric circuitry on the board 6. These circuit elements are conventional and not shown specifically.

Figure 3:
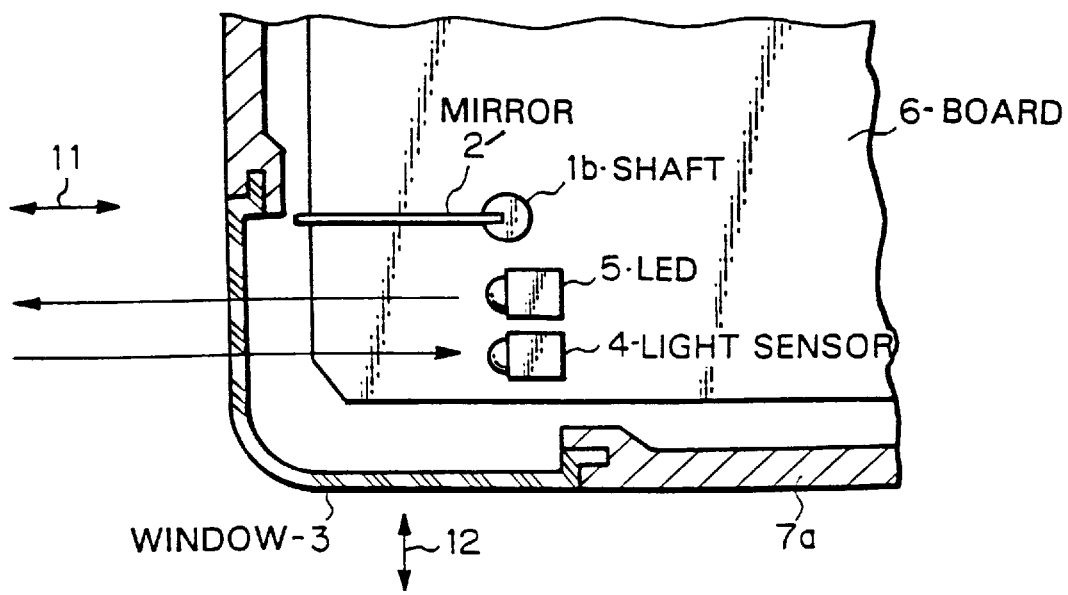
FIGS. 3 and 4 are sections along line III—III of FIG. 1.

The operation of the illustrative embodiment will be described with reference to FIGS. 3 and 4. In the condition shown in FIG. 3, the light-sensitive device 4 and light emitting device 5 are oriented in the direction II while the mirror 2 is so positioned as not to interfere with infrared rays. The devices 4 and 5 are therefore capable of receiving and emitting infrared rays in the direction 11; that is, the data terminal is capable of interchanging data with another data terminal facing it in the direction 11.

Figure 4:
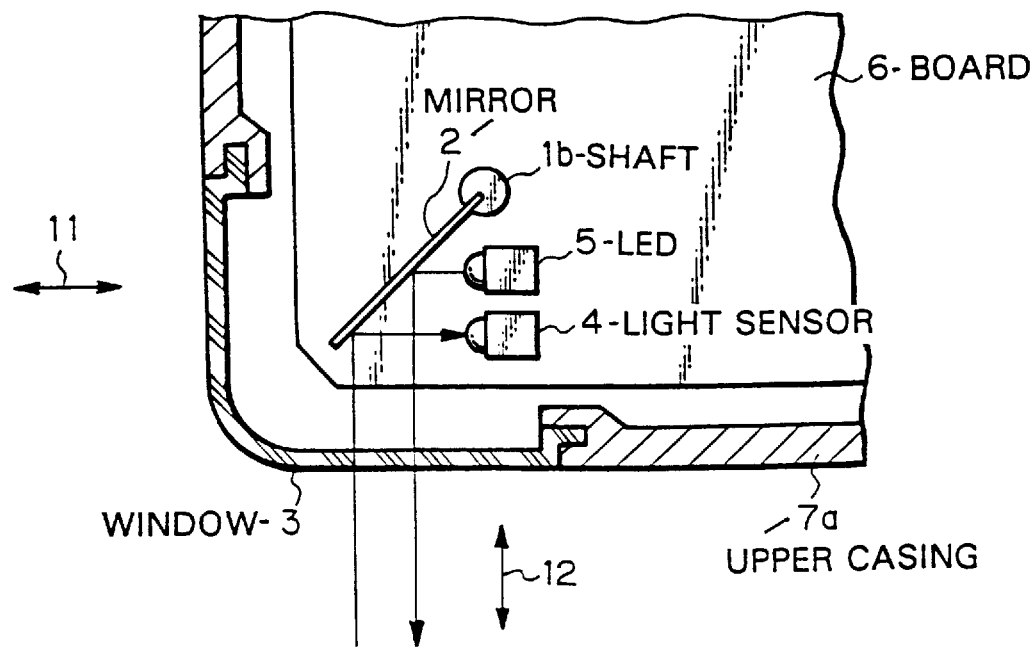

Assume that the user of the data terminal turns the dial 1a until the mirror 2 reaches the position shown in FIG. 4. Then, infrared rays can be emitted and received in the direction 12 by being reflected by the mirror 2. Specifically, when the dial 1a is turned 45 degrees clockwise, as viewed in FIG. 3, it rotates the mirror 2 via the shaft 1b to the position shown in FIG. 4. As a result, infrared rays issuing from the device 5 are reflected by the mirror 2 in the direction 12. Likewise, infrared rays coming in in the direction 12 are reflected by the mirror 2 toward the device 4. In this condition, the data terminal is capable of communicating with another data terminal facing it in the direction 12.

Figure 5:
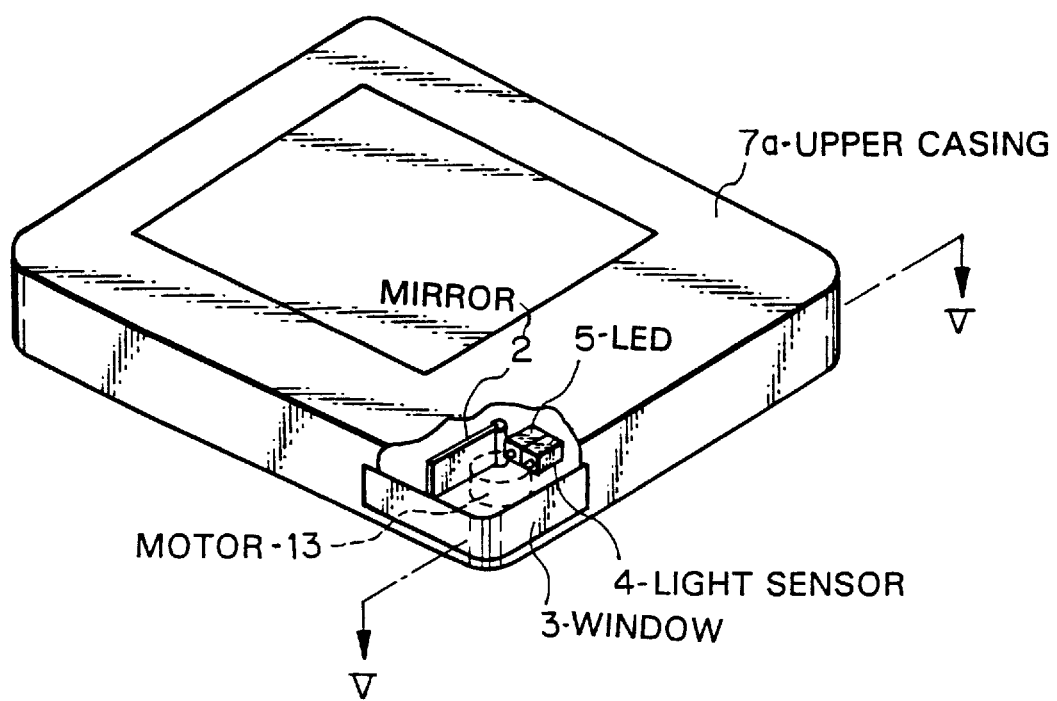
FIG. 5 is a perspective view showing an alternative embodiment of the present invention.

FIG. 5 shows an alternative embodiment of the present invention. As shown, the operating means is implemented as a motor 13 for driving the dial 1a and shaft 1b. Means is provided for sensing infrared rays incident to the light-sensitive element 4. In addition, control means is provided for controlling the motor 13 in response to incident infrared rays, so that the mirror 2 can be brought to an adequate angular position. Specifically, the mirror 2 is mounted on the output shaft of the motor 13. The means for sensing infrared rays and control means are, of course, implemented as electric circuitry on the board 6 although not shown specifically.

In the above embodiment, only if the light input/output section of the data terminal is roughly oriented toward the light input/output section of another data terminal, and then a communication command is input on the terminal, desirable data communication can be set up between the two terminals.

Figure 6:
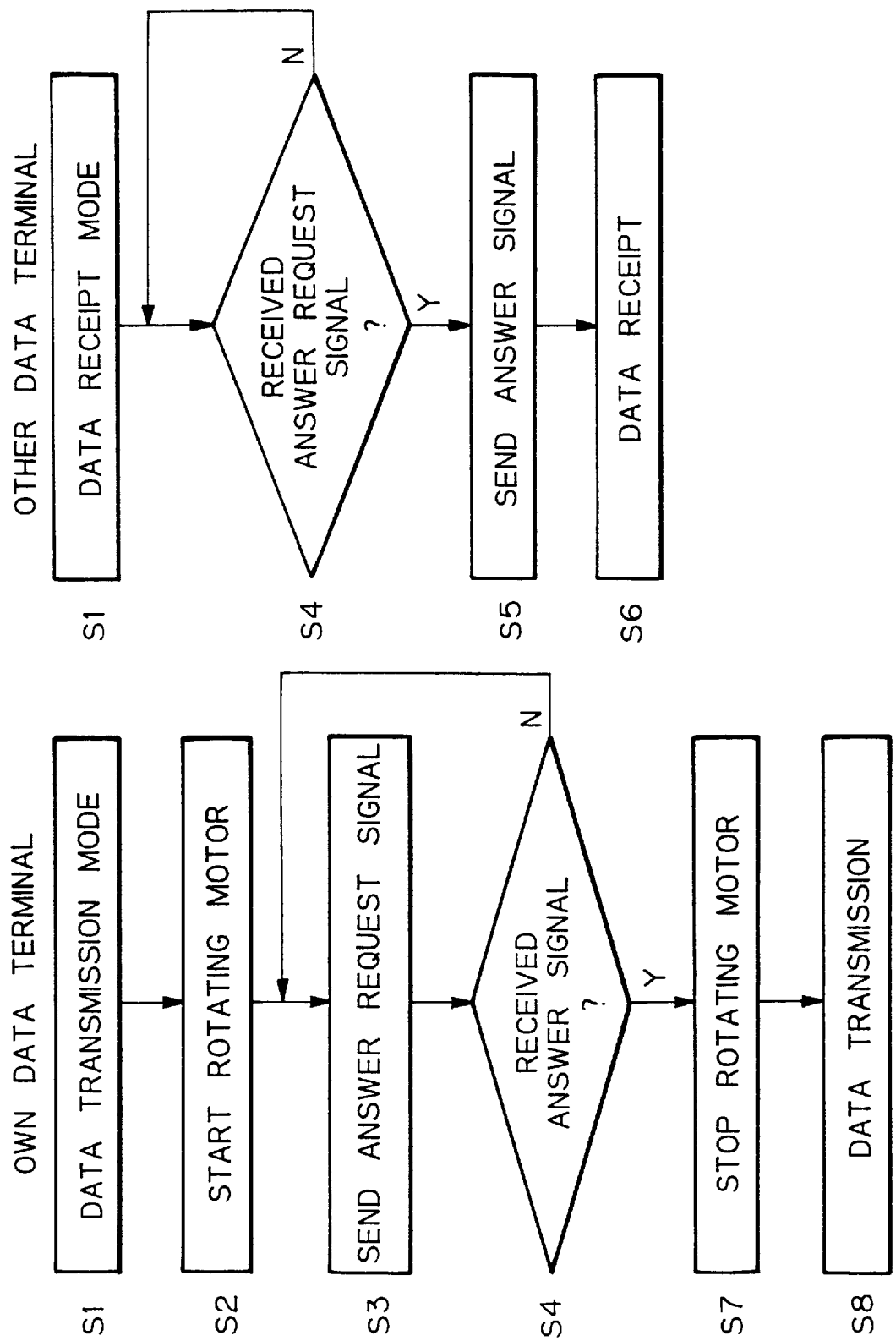
FIG. 6 is a flowchart demonstrating a specific operation of the embodiment shown in FIG. 5.
Figure 7:
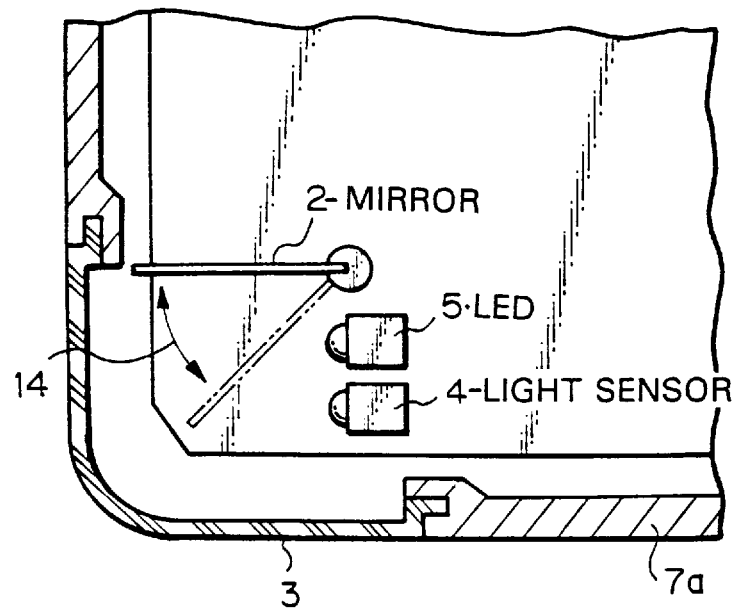
FIG. 7 is a section along line VII—VII of FIG. 5.

FIG. 6 demonstrates a specific operation of the embodiment shown in FIG. 5. As shown, the user of the data terminal roughly orients the data terminal toward a desired data terminal, and then inputs a communication command, as stated above (step S1). At the beginning of data communication, the angular position of the mirror 2 is not stable. Therefore, the motor 13, i.e., mirror 2 is rotated (step S2) while an answer request signal is sent to the remote data terminal (step S3). At this instant, the motor 13 is rotated in opposite directions so as to move the mirror 2 back and forth over an angular range of 45 degrees shown in FIG. 7.

On receiving the answer request signal (step S4), the other or remote data terminal returns an answer signal (step S5) and becomes ready to receive data (step S6). In response to the answer signal, the data terminal sent the answer request signal deenergizes the motor 13 (step S7) and thereby fixes the angular position of the mirror 2. As a result, the direction of communication between the two terminals is fixed. Then, data in the form of infrared rays are interchanged between the two terminals (step S8).

Assume that the answer signal from the remote terminal is not received despite the several times of reciprocating movement of the mirror 2. Then, an alert informing the user that communication is not available may be produced in the form of a message, alert tone, etc.

While the above description has concentrated on the transmission of data from the data terminal to another data terminal, the embodiment is capable of receiving data from another terminal in exactly the same manner only if data receipt is substituted for data transmission.

In summary, it will be seen that the present invention provides a light input/output section included in a portable infrared data communication terminal having the following unprecedented advantages. The terminal is capable of communicating with another data terminal over a broad range of positions. This allows the user of the terminal to communicate with another person while maintaining it in an easy-to-handle position, i.e., allows the user to change the orientation of the light input/output section of the terminal easily. Further, desirable data communication can be set up automatically with a mirror brought to its adequate position before the beginning of communication. The user therefore should only roughly orient the terminal toward a desired data terminal.

Various modifications will become possible for those skilled in the art after receiving the teachings of the present disclosure without departing from the scope thereof.

What is claimed is:

1. A light input/output section for a portable infrared data communication unit, comprising:

at least one of a light emitting device for emitting infrared rays and a light-sensitive device for receiving infrared rays;

a casing defining an interior space and accommodating the at least one device therein, the casing having an aperture permitting infrared rays to travel therethrough in at least a first direction and a second direction;

a reflecting surface provided within the interior space of the casing, the reflecting surface being orientable between at least a first position, in which infrared rays emitted or received by the at least one device travel through the aperture in the first direction, and a second position, in which infrared rays emitted or received by the at least one device travel through the aperture in the second direction; and orientation mechanism operable from the exterior of the casing for selectively orienting the reflecting surface between at least the first and second positions so that the infrared rays emitted or received by the at least one device exit or enter the light input/output section in at least one of the first or second directions.

2. The light input/output section of claim 1, further comprising:
   at least one of a light emitting circuit and a light receiving circuit for respectively driving said at least one device; and
   a data controller transforming data to be transmitted as an infrared signal comprising the infrared rays emitted by the light emitting device or transforming a received infrared signal comprising the infrared rays received by the light-sensitive device to data.

3. The light input/output section of claim 1, further comprising a light transmitting window member disposed in the aperture.

4. The light input/output section of claim 1, wherein the orientation mechanism includes an operating member provided on an outer surface of the casing, and a shaft extending from the operating member through the casing and into the interior space of the casing, wherein the reflecting surface engages the shaft so as to be orientable by orientation of the operating member exterior to the casing.

5. The light input/output section of claim 4, wherein the reflecting surface engages the shaft by a mating portion included in the reflecting surface and a corresponding recess formed in the shaft.

6. The light input/output section of claim 1, wherein the reflecting surface is a mirror.

7. The light input/output section of claim 1, wherein the reflecting surface is rotatable between the first position and the second position.

8. The light input/output section of claim 1, wherein the reflecting surface reflects the infrared rays emitted or received by the at least one device in the first position.

9. The light input/output section of claim 8, wherein the reflecting surface reflects the infrared rays emitted or received by the at least one device in the second position.

10. The light input/output section of claim 8, wherein the reflecting surface does not reflect the infrared rays emitted or received by the at least one device in the second position.

11. A light input/output section for a portable infrared data communication unit, comprising:
    at least one of a light emitting device for emitting infrared rays in a first direction and a light-sensitive device for receiving infrared rays in the first direction;
    a casing accommodating the at least one device therein; and
    a reflecting surface provided within the casing, the reflecting surface being orientable between at least a first position, in which infrared rays emitted or received by the at least one device are not reflected by the reflecting surface so as to exit or enter the light input/output section in the first direction, and a second position, in which infrared rays emitted or received by the at least one device are reflected by the reflecting surface so as to exit or enter the light input/output section in the second direction.

12. The light input/output section of claim 11, further comprising:
    at least one of a light emitting circuit and a light receiving circuit for respectively driving said at least one device; and
    a data controller transforming data to be transmitted as an infrared signal comprising the infrared rays emitted by the light emitting device or transforming a received infrared signal comprising the infrared rays received by the light-sensitive device to data.

13. The light input/output section of claim 11, further comprising an orientation mechanism operable from the exterior of the casing for selectively orienting the reflecting surface between at least the first and second positions so that the infrared rays emitted or received by the at least one device exit or enter the light input/output section in at least one of the first or second directions.

14. The light input/output section of claim 13, wherein the orientation mechanism includes an operating member provided on an outer surface of the casing, and a shaft extending from the operating member through the casing and into the interior space of the casing, wherein the reflecting surface engages the shaft so as to be orientable by orientation of the operating member exterior to the casing.

15. The light input/output section of claim 14, wherein the reflecting surface engages the shaft by a mating portion included in the reflecting surface and a corresponding recess formed in the shaft.

16. The light input/output section of claim 11, wherein the reflecting surface is a mirror.

17. The light input/output section of claim 11, wherein the reflecting surface is rotatable between the first position and the second position.

18. The light input/output section of claim 11, further comprising an orientation mechanism orienting the reflecting surface between at least the first and second positions in response to inbound infrared signals comprising infrared rays external to the light input/output section so that the inbound infrared signals are received by the light-sensitive device.

19. The light input/output section of claim 18, wherein the orientation mechanism comprises an actuator for orienting the reflecting surface and an orientation controller operably coupled to the light-sensitive device and the actuator, the orientation controller controlling the actuator to orient the reflecting surface among at least the first and second positions until the infrared rays comprising the inbound infrared signals are received by the light-sensitive device.

20. The light input/output section of claim 19, wherein the actuator is a motor.

21. The light input/output section of claim 19, wherein the orientation controller controls the actuator to fix the position of the reflecting surface at the position in which the inbound infrared signals are received by the light-sensitive device.

22. The light input/output section of claim 19, wherein the orientation controller produces an alert if an inbound infrared signal is not received.

23. The light input/output section of claim 18, further comprising an answer request signal transmitter transmitting an answer request signal comprising infrared rays emitted by the light emitting device for requesting the transmission of the inbound infrared signal from an external device.

24. A light input/output section for a portable infrared data communication unit, comprising:
    at least one of a light emitting device for emitting infrared rays and a light-sensitive device for receiving infrared rays;
    a casing accommodating the at least one device therein;
    a reflecting surface movably coupled to the casing, the reflecting surface being orientable between at least a first position, in which infrared rays emitted or received by the at least one device exit or enter the light input/output section in a first direction, and a second position, in which infrared rays emitted or received by the at least one device exit or enter the light input/output section in a second direction; and an orientation mechanism orienting the reflecting surface between at least the first and second positions in response to inbound infrared signals comprising infrared rays external to the light input/output section so that the inbound infrared signals are received by the light-sensitive device.

25. The light input/output section of claim 26, wherein the orientation mechanism comprises an actuator for orienting the reflecting surface and an orientation controller operably coupled to the light-sensitive device and the actuator, the orientation controller controlling the actuator to orient the reflecting surface among at least the first and second positions until the infrared rays comprising the inbound infrared signals are received by the light-sensitive device.

26. The light input/output section of claim 25, wherein the actuator is a motor.

27. The light input/output section of claim 25, wherein the orientation controller controls the actuator to fix the position of the reflecting surface at the position in which the inbound infrared signals are received by the light-sensitive device.

28. The light input/output section of claim 25, wherein the orientation controller produces an alert if an inbound infrared signal is not received.

29. The light input/output section of claim 24, further comprising an answer request signal transmitter transmitting an answer request signal comprising infrared rays emitted by the light emitting device for requesting the transmission of the inbound infrared signal from an external device.

30. The light input/output section of claim 24, further comprising:
    at least one of a light emitting circuit and a light receiving circuit for respectively driving said at least one device; and
    a data controller transforming data to be transmitted as an infrared signal comprising the infrared rays emitted by the light emitting device or transforming a received infrared signal comprising the infrared rays received by the light-sensitive device to data.

31. The light input/output section of claim 24, wherein the reflecting surface is a mirror.

32. The light input/output section of claim 24, wherein the reflecting surface is rotatable between the first position and the second position.

33. The light input/output section of claim 24, wherein the reflecting surface reflects the infrared rays emitted or received by the at least one device in the first position.

34. The light input/output section of claim 33, wherein the reflecting surface reflects the infrared rays emitted or received by the at least one device in the second position.

35. The light input/output section of claim 33, wherein the reflecting surface does not reflect the infrared rays emitted or received by the at least one device in the second position.

* * * * *